(No Model.)
M. J. McBURNETT.
PLOW.
No. 486,492.  Patented Nov. 22, 1892.
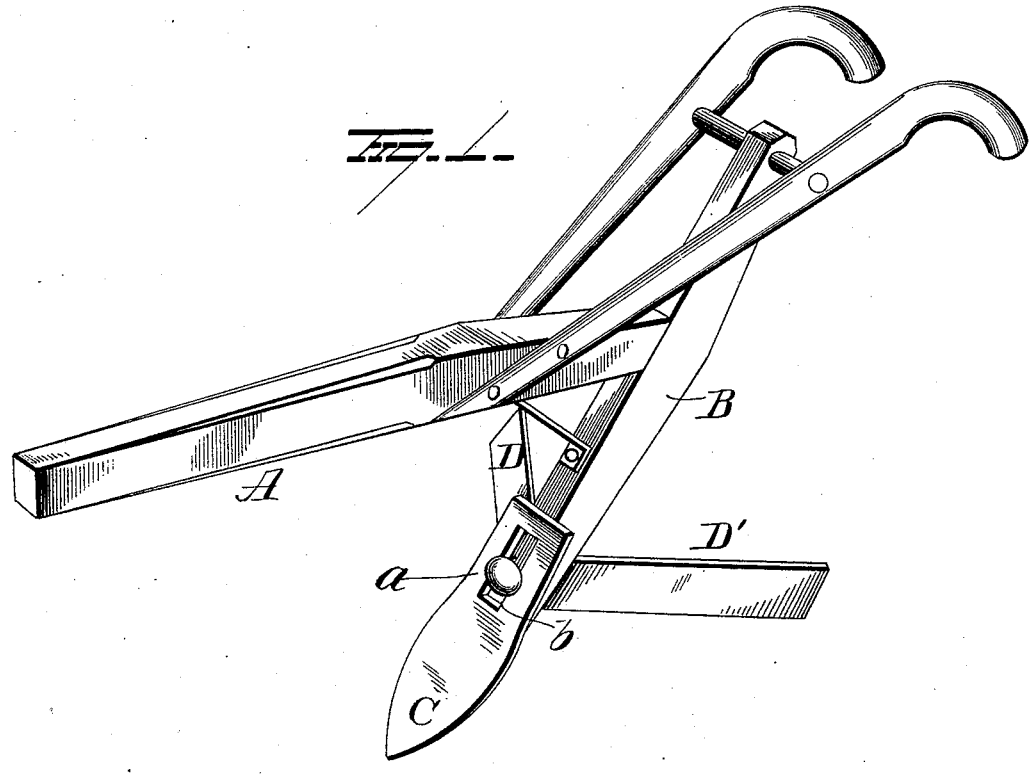
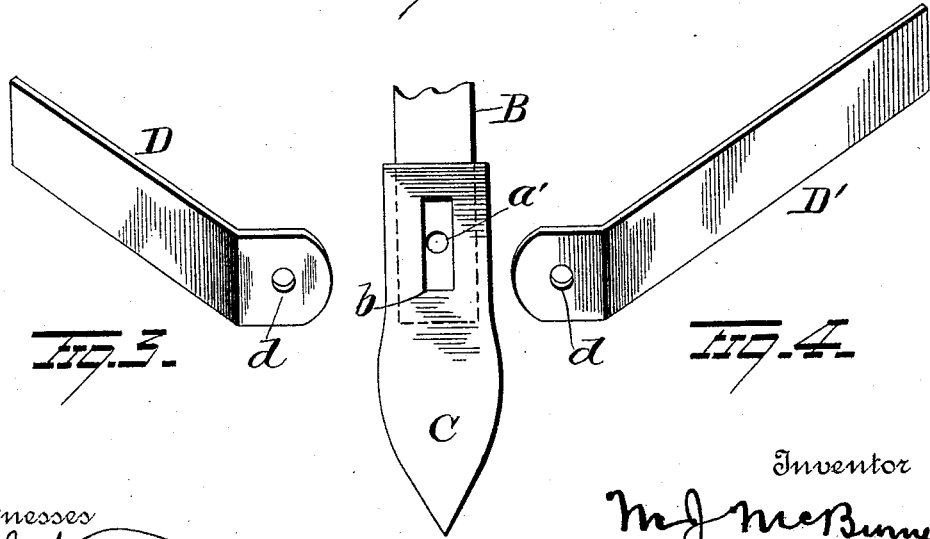
Witnesses
G. J. Nottingham
G. F. Downing
Inventor
M. J. McBurnett
By H. A. Seymour,
Attorney

UNITED STATES PATENT OFFICE.

MILFORD J. McBURNETT, OF WEDOWEE, ALABAMA.

PLOW.

SPECIFICATION forming part of Letters Patent No. 486,492, dated November 22, 1892.

Application filed October 28, 1891. Serial No. 410,065. (No model.)

*To all whom it may concern:*

Be it known that I, MILFORD J. MCBURNETT, of Wedowee, in the county of Randolph and State of Alabama, have invented certain new and useful Improvements in Plows; and I do hereby declare the following to be a full, clear, and exact description of the invention, such as will enable others skilled in the art to which it appertains to make and use the same.

My invention relates to an improvement in plows, the object being to provide means for the adjustment of the shovel on the standard. A further object is to provide means whereby the plow can be adjusted for deep or shallow plowing, and also for securing sweeps to the plow.

With these ends in view my invention consists in certain novel features of construction and combinations of parts, as will be hereinafter more fully described, and pointed out in the claim.

In the accompanying drawings, Figure 1 is a view in perspective of my improvement attached to a plow-beam and standard, and Figs. 2, 3, and 4 are detached views.

A represents a plow-beam, to which is attached the standard B, the lower end of which latter is provided with a suitable hole $a'$ for the reception of the bolt $a$, by means of which the shovel and sweeps are rigidly held in place.

C indicates the shovel, constructed in the usual manner and provided with an elongated slot, as shown at $b$, which latter permits the shovel to be adjusted for shallow or deep plowing, as necessity or circumstances demand. Secured to the standard B by means of the bolt $a$ are two sweeps D D', which are made in two pieces, one sweep being longer than the other, or, if desired, both can be made of uniform length. The inclination of one or both sweeps can at any time be changed by loosening the nut on the bolt $a$ and by changing the angle of inclination of one or both sweeps until the desired position is obtained. By constructing the sweeps as above described it will be seen that far better results will be attained than is possible with the sweeps made in one piece.

When the plow is ready for use, it will be seen that the shovel C rests against the plow-standard, the elongated slot $b$ registering with the bolt-hole $a'$, while the sweeps overlap each other and bear against the standard. The holes $d$ in the ends of the sweeps also register with the slot $b$ in the shovel and the hole in the standard. The bolt is then passed through the several openings, the nut applied, and the parts secured in their proper position.

By constructing the sweeps in two pieces and of different lengths it will be noticed that the side having the short sweep will pull the dirt to the small growing crop, while the other makes a wider cut in the middle or space between the rows. By providing the head of the shovel with an elongated slot it is capable of being adjusted for deep or shallow plowing, which cannot be accomplished with shovels as heretofore constructed. It will also be seen that the sweeps and shovel are all held by means of a single bolt.

It is evident that in assembling the several parts it is not essential that the shovel should rest against the standard, as heretofore described; but it may be placed on top of the sweeps, so that the head of the bolt or the nut will abut against the upper face of the shovel, and it is further evident that my improvements are equally as well applicable to plows other than shovel-plows.

Having fully described my invention, what I claim as new, and desire to secure by Letters Patent, is—

The combination, with a standard or other support and a shovel having an elongated slot formed therein, of a bolt passed through the standard and slot and a pair of wings of different lengths having offset inner ends and holes in said ends adapted to receive the bolt which passes through the slot, whereby all of said parts are held together by the same bolt, substantially as set forth.

In testimony whereof I have signed this specification in the presence of two subscribing witnesses.

MILFORD J. McBURNETT.

Witnesses:
 R. T. WEST,
 A. D. SMITH.